US011396291B2

(12) United States Patent
Kobayashi et al.

(10) Patent No.: US 11,396,291 B2
(45) Date of Patent: Jul. 26, 2022

(54) INFERRING A LANE BOUNDARY POSITION BY THE DETECTED POSITION OF OTHER VEHICLES IN DIFFERENT LANES

(71) Applicant: HONDA MOTOR CO., LTD., Tokyo (JP)

(72) Inventors: Sachio Kobayashi, Wako (JP); Eiki Sato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 357 days.

(21) Appl. No.: 16/429,709

(22) Filed: Jun. 3, 2019

(65) Prior Publication Data
US 2019/0367024 A1 Dec. 5, 2019

(30) Foreign Application Priority Data

Jun. 4, 2018 (JP) .............................. JP2018-106608

(51) Int. Cl.
| | | |
|---|---|---|
| B60W 30/12 | (2020.01) | |
| G06V 20/56 | (2022.01) | |
| G06T 7/70 | (2017.01) | |
| G06T 7/50 | (2017.01) | |
| G06K 9/62 | (2022.01) | |

(52) U.S. Cl.
CPC .............. *B60W 30/12* (2013.01); *G06T 7/50* (2017.01); *G06T 7/70* (2017.01); *G06V 20/588* (2022.01); *B60W 2420/42* (2013.01); *B60W 2420/52* (2013.01); *B60W 2554/80* (2020.02); *G06K 9/6288* (2013.01); *G06T 2207/10004* (2013.01); *G06T 2207/10044* (2013.01); *G06T 2207/30256* (2013.01); *G06V 2201/08* (2022.01)

(58) Field of Classification Search
None
See application file for complete search history.

(56) References Cited

U.S. PATENT DOCUMENTS 8,504,233 B1 * 8/2013 Ferguson ........... G06K 9/00805
701/23
10,048,688 B2 * 8/2018 Ramasamy ...... G08G 1/096741
(Continued)

FOREIGN PATENT DOCUMENTS

| JP | 2000-235699 A | 8/2000 |
|---|---|---|
| JP | 2010-023721 A | 2/2010 |

(Continued)

OTHER PUBLICATIONS

Office Action dated Nov. 2, 2021 issued over the corresponding Japanese Patent Application No. 2018-106608 with the English translation thereof.

(Continued)

*Primary Examiner* — Todd Melton
(74) *Attorney, Agent, or Firm* — Carrier Blackman & Associates, P.C.; Joseph P. Carrier; Jeffrey T. Gedeon (57) ABSTRACT

A vehicle control device is equipped with a detection unit configured to detect lane markings and another vehicle on the basis of peripheral information, and a control unit which, in the case that the lane marking is detected on one side of a host vehicle, but the lane marking is not detected on another side of the host vehicle, is configured to control the host vehicle on the basis of the positions of a plurality of the other vehicles that are traveling respectively in mutually different lanes.

6 Claims, 9 Drawing Sheets

(56) References Cited

U.S. PATENT DOCUMENTS

| | | | |
|---|---|---|---|
| 10,650,253 B2* | 5/2020 | Bayer | G06K 9/629 |
| 10,776,634 B2* | 9/2020 | Meis | G08G 1/167 |
| 2008/0208471 A1* | 8/2008 | Noyer | G01C 21/26 |
| | | | 701/300 |
| 2009/0088966 A1 | 4/2009 | Yokoyama et al. | |
| 2010/0295668 A1 | 11/2010 | Kataoka | |
| 2017/0060136 A1 | 3/2017 | Kobayashi | |

FOREIGN PATENT DOCUMENTS

| | | |
|---|---|---|
| JP | 2010-163164 A | 7/2010 |
| JP | 2010-170255 A | 8/2010 |
| JP | 2010-271999 A | 12/2010 |
| JP | 2015-018447 A | 1/2015 |
| JP | 2015-523256 A | 8/2015 |
| JP | 2017-049771 A | 3/2017 |
| WO | 2013/162847 A1 | 10/2013 |

OTHER PUBLICATIONS

Office Action dated Jan. 18, 2022 issued over the corresponding Japanese Patent Application No. 2018-106608 with the English translation thereof.

Office Action including search report dated Mar. 11, 2022 issued over the corresponding Chinese Patent Application No. 201910480693.1 with the English translation of the pertinent portion and partial machine translation of search report.

\* cited by examiner

INFERRING A LANE BOUNDARY POSITION BY THE DETECTED POSITION OF OTHER VEHICLES IN DIFFERENT LANES

CROSS-REFERENCE TO RELATED APPLICATION

This application is based upon and claims the benefit of priority from Japanese Patent Application No. 2018-106608 filed on Jun. 4, 2018, the contents of which are incorporated herein by reference.

BACKGROUND OF THE INVENTION

Field of the Invention

The present invention relates to a vehicle control device, a vehicle control method, and a non-transitory computer-readable medium storing a program.

Description of the Related Art

A technique has been proposed in which, in the case that lane markings (vehicle partition lines) on one side are detected, whereas lane markings on another side are not detected, the position of the undetected lane markings is estimated on the basis of roadside objects located on the other side (see Japanese Laid-Open Patent Publication No. 2010-271999). In accordance with such a technique, it is possible to estimate the position of the lane markings, even in the event that the lane markings on the other side cannot be detected.

SUMMARY OF THE INVENTION

However, with the technique described in Japanese Laid-Open Patent Publication No. 2010-271999, in the case that an adjacent lane exists on the other side, the lane markings cannot be suitably estimated on the other side on the basis of such roadside objects. If the lane markings on the other side cannot be suitably estimated, the host vehicle lane cannot be grasped in a suitable manner, and traveling of the host vehicle cannot be suitably controlled.

An object of the present invention is to provide a vehicle control device, a vehicle control method, and a non-transitory computer-readable medium storing a program, in which traveling of a host vehicle can be controlled in a more suitable manner.

A vehicle control device according to one aspect of the present invention is equipped with a detection unit configured to detect lane markings and another vehicle on the basis of peripheral information, and a control unit which, in the case that the lane markings are detected on one side of a host vehicle, but the lane markings are not detected on another side of the host vehicle, is configured to control the host vehicle on the basis of the positions of a plurality of the other vehicles that are traveling respectively in mutually different lanes.

A vehicle control method according to another aspect of the present invention comprises a step of detecting lane markings and another vehicle on the basis of peripheral information, and a step of controlling a host vehicle on the basis of the positions of a plurality of the other vehicles that are traveling respectively in mutually different lanes, in the case that the lane markings are detected on one side of the host vehicle, but the lane markings are not detected on another side of the host vehicle.

According to a further aspect of the present invention, a non-transitory computer-readable storage medium storing a program serves to execute in a computer a step of detecting lane markings and another vehicle on the basis of peripheral information, and a step of controlling a host vehicle on the basis of the positions of a plurality of the other vehicles that are traveling respectively in mutually different lanes, in the case that the lane markings are detected on one side of the host vehicle, but the lane markings are not detected on another side of the host vehicle.

According to the present invention, it is possible to provide a vehicle control device, a vehicle control method, and a non-transitory computer-readable medium storing a program, in which traveling of a host vehicle can be controlled in a more suitable manner.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a vehicle control device, a vehicle control method, and a non-transitory computer-readable medium storing a program according to the present invention will be presented and described in detail below with reference to the accompanying drawings.

Embodiment

Figure 1:
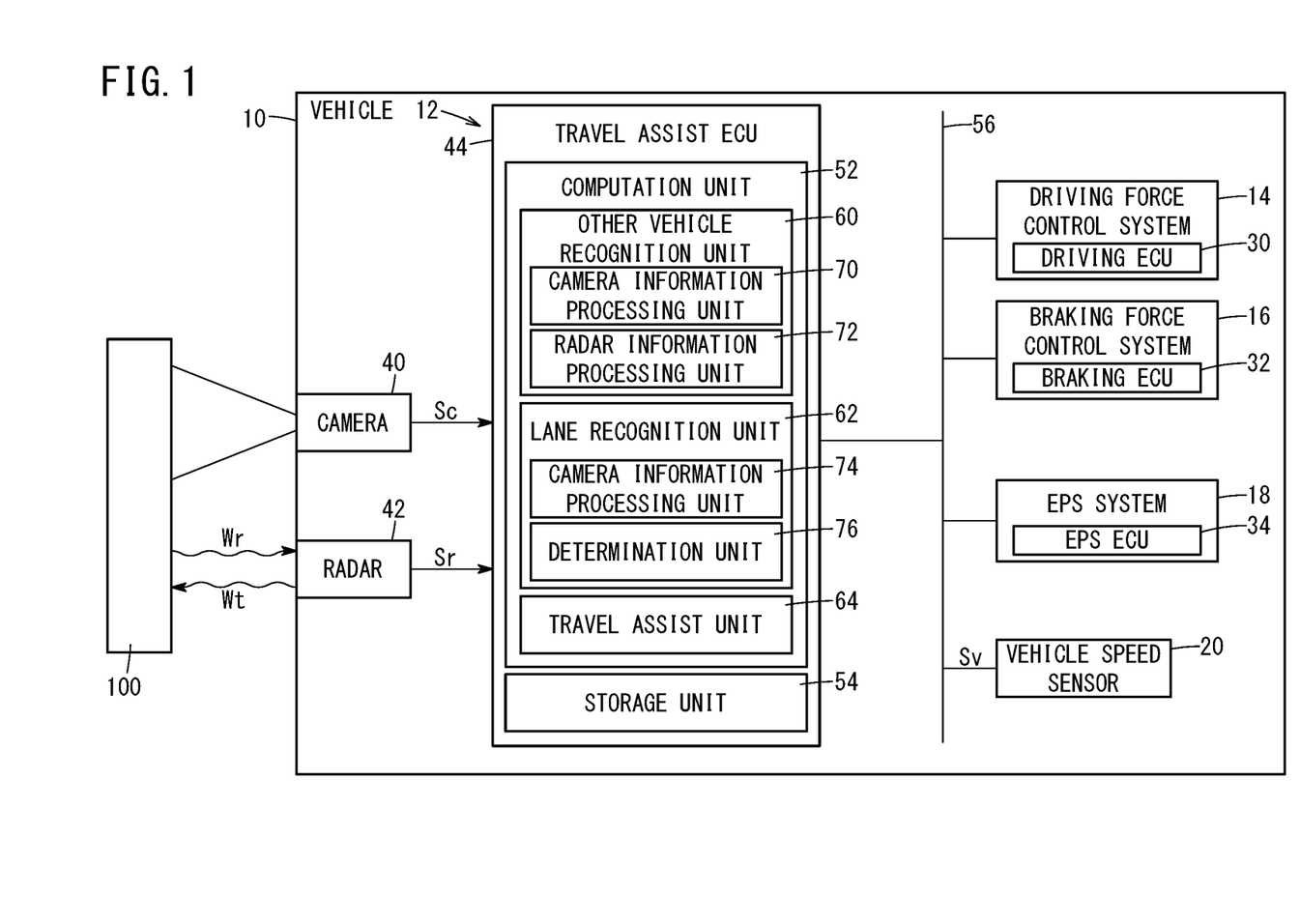
FIG. 1 is a block diagram showing a vehicle equipped with a vehicle control device according to an embodiment of the present invention.

A vehicle control device according to an embodiment of the present invention, a vehicle control method, and a non-transitory computer-readable medium storing a program will be described with reference to the drawings. FIG. 1 is a block diagram showing a vehicle equipped with a vehicle control device according to the present embodiment.

A vehicle (a host vehicle or driver's own vehicle) 10 is equipped with a travel assist system 12, a driving force control system 14, a braking force control system 16, an EPS system (electric power steering system) 18, and a vehicle speed sensor 20.

A travel assist ECU (travel assist electronic control device, vehicle control device) 44 is provided in the travel assist system 12. The travel assist system 12 detects various peripheral objects (detected objects) 100 and lane markings 112 appearing around the periphery of the host vehicle 10. It should be noted that, when describing the lane markings in general, the reference numeral 112 is used, and when describing individual lane markings, the reference numerals 112L1, 112L2, 112R1, and 112R2 (see FIG. 2) are used. As the peripheral objects 100, for example, other vehicles 102, which are vehicles other than the host vehicle 10, may be cited. It should be noted that, when describing the other vehicles in general, the reference numeral 102 is used, and when describing particular instances of the other vehicles individually, the reference numerals 102a to 102j (see FIGS. 2 to 5) are used. Further, pedestrians, walls, or the like, none of which are shown, may also be cited as the peripheral objects 100. The travel assist system 12 assists traveling of the vehicle 10 depending on the peripheral objects 100 and the lane markings 112.

The driving force control system 14 is equipped with a driving ECU 30. The driving force control system 14 executes a driving force control for the vehicle 10. The driving ECU 30 controls the driving force of the vehicle 10 by controlling a non-illustrated engine or the like. In the driving force control carried out in the present embodiment, an automatic cruise control is included. The automatic cruise control serves to control traveling of the vehicle 10 in a manner so that the vehicle speed coincides with a target vehicle speed.

The braking force control system 16 is equipped with a braking ECU 32. The braking force control system 16 executes a braking force control for the vehicle 10. The braking ECU 32 controls the braking force of the vehicle 10 by controlling a non-illustrated braking mechanism or the like.

The EPS system 18 is equipped with an EPS ECU 34. The EPS system 18 executes a steering assist control. The EPS ECU 34 assists the steering performed by the driver by controlling the constituent elements of an electric power steering device and the like. As the constituent elements of the electric power steering device, there may be cited a non-illustrated electric motor, a non-illustrated torque sensor, a non-illustrated steering angle sensor, and the like.

The vehicle speed sensor 20 detects the vehicle speed of the vehicle 10. The vehicle speed sensor 20 supplies vehicle speed information Sv, which is information indicating the vehicle speed, to the travel assist system 12, etc.

The travel assist system 12 is further equipped with a camera (image capturing unit) 40. Camera information Sc, which is information acquired by the camera 40, is supplied from the camera 40 to the travel assist ECU 44. Images (captured images) acquired by the camera 40 are included in the camera information Sc. The camera information Sc, together with later-described radar information Sr, makes up the peripheral information of the host vehicle 10. The detected objects 100 detected by the camera 40 are referred to as camera targets.

Although a single camera 40 is illustrated in FIG. 1, a plurality of cameras 40 may be provided. For example, a stereo camera may be configured by arranging two cameras 40 in a symmetrical fashion. The camera 40, for example, acquires images at 15 frames per second or faster. In the present embodiment, for example, images of 30 frames per second are acquired by the camera 40. The camera 40 may be a monochrome camera that acquires monochrome images, or may be a color camera that acquires color images. Further, the camera 40 may acquire images in a visible light range or may acquire images in an infrared range. The camera 40, for example, is disposed on a central part in a widthwise direction of the vehicle, on a front portion in the passenger compartment of the vehicle 10. More specifically, the camera 40 is disposed in the vicinity of a rearview mirror. Moreover, the camera 40 may be disposed on a central part in the widthwise direction on a front bumper of the vehicle 10.

The travel assist system 12 is equipped with a radar 42. The radar 42 emits transmitted waves Wt to the exterior of the vehicle 10, and receives reflected waves Wr which are reflected and returned from among the transmitted waves Wt by the detected objects 100. As the transmitted waves Wt, for example, electromagnetic waves, and more specifically millimeter waves or the like, are used. As described above, the detected objects 100 are the non-illustrated pedestrians and walls, the other vehicles 102, or the like. The radar 42 generates radar information (reflected wave signals) Sr based on the reflected waves Wr and the like. The radar 42 supplies the radar information Sr to the travel assist ECU 44. The detected objects 100 detected by the radar 42 are referred to as radar targets.

Although a single radar 42 is illustrated in FIG. 1, a plurality of radars 42 may be provided. The radar 42 is disposed, for example, on a front side of the vehicle 10. For example, the radar 42 is disposed on a front bumper, a front grille, or the like. The radar 42 may also be disposed on a rear side of the vehicle 10. For example, the radar 42 may be disposed on a rear bumper, a rear grille, or the like. Further, the radar 42 may be disposed on a side of the vehicle 10. For example, the radar 42 may be disposed on a side of the front bumper. The radar 42 is not limited to being a millimeter wave radar. For example, a laser radar, an ultrasonic sensor, or the like may be used as the radar 42.

The travel assist ECU 44 administers and is responsible for overall control of the travel assist system 12. A computation unit 52 and a storage unit 54 are provided in the travel assist ECU 44.

The camera information Sc and the radar information Sr are supplied to the travel assist ECU 44. The travel assist ECU 44 communicates via a communication line (signal line) 56 with the driving ECU 30, the braking ECU 32, and the EPS ECU 34. The travel assist ECU 44 is equipped with a non-illustrated input/output unit. The input/output unit is equipped with a non-illustrated A/D converter for converting analog signals into digital signals.

The computation unit (computer) 52 is constituted, for example, by a CPU (Central Processing Unit). The computation unit 52 performs predetermined arithmetic processing using the camera information Sc, the radar information Sr, and the vehicle speed information Sv. Based on the results of such arithmetic processing, the computation unit 52 generates signals to be supplied to each of the driving ECU 30, the braking ECU 32, and the EPS ECU 34.

The computation unit 52 is equipped with an other vehicle recognition unit (detection unit) 60, a lane recognition unit (travel lane recognition unit, detection unit) 62, and a travel assist unit (control unit) 64. The other vehicle recognition unit 60, the lane recognition unit 62, and the travel assist unit 64 are realized by the computation unit 52 executing programs stored in the storage unit 54. The concerned programs need not necessarily be stored in the storage unit 54. For example, such programs may be supplied from the exterior via a non-illustrated wireless communication device. As examples of such a wireless communication device, there may be cited a mobile telephone, a smart phone, or the like.

The other vehicle recognition unit 60 is equipped with a camera information processing unit 70 and a radar information processing unit 72. The camera information processing unit 70 recognizes the other vehicles 102 on the basis of the camera information Sc. The camera information processing unit 70 recognizes the other vehicles 102 by performing pattern matching, for example. The radar information processing unit 72 recognizes the size, the relative velocity, etc., of the detected objects 100 including the other vehicles 102 on the basis of the radar information Sr. By combining the process performed by the camera information processing unit 70 and the process performed by the radar information processing unit 72, the positions, the types, etc., of the other vehicles 102 can be recognized. More specifically, the positions, the types, etc., of the other vehicles 102 can be recognized based on the camera targets and the radar targets. Although the positions of the other vehicles 102 may be any positions on the longitudinal center line of the other vehicles 102, the present embodiment is not limited to this feature. More specifically, although the positions of the other vehicles 102 can be the center positions of the rear ends of the other vehicles 102, the present embodiment is not limited to this feature.

The lane recognition unit 62 is equipped with a camera information processing unit 74 and a determination unit 76. The camera information processing unit 74 detects the lane markings 112 on the basis of the camera information Sc. The camera information processing unit 74 uses, for example, pattern matching when detecting the lane markings 112. The determination unit 76 determines, for example, the position of the host vehicle lane 110C, which is a lane (travel lane) in which the host vehicle 10 travels, on the basis of the lane markings 112 located on the left and right sides of the host vehicle 10. In the case that only one of the lane markings 112 from among the lane markings 112 on the left and right sides of the host vehicle 10 is detected, the determination unit 76 performs the following process. More specifically, in such a case, the determination unit 76 estimates the position of the other lane markings 112, based on the one of the lane markings 112, and on the positions of the plurality of other vehicles 102 that are traveling respectively in the mutually different lanes 110. Details concerning the process performed by the determination unit 76 will be described later. It should be noted that, when describing the lanes in general, the reference numeral 110 is used, and when describing individual lanes, the reference numerals 110L1, 110C, and 110R1 (see FIG. 2) are used.

The travel assist unit 64 performs a travel assist for the vehicle 10, on the basis of the information (other vehicle information) of the other vehicles 102 supplied from the other vehicle recognition unit 60, and the information (lane information, travel lane information) of the lanes 110 recognized by the lane recognition unit 62. Further, as will be described later, the travel assist unit 64 can control traveling of the host vehicle 10 on the basis of an estimated lane width WL of the host vehicle lane 110C, and the lane markings 112 located on one side of the host vehicle 10. Such a travel assist includes, for example, at least one of a Lane Keeping Assistance System (LKAS) control and a Road Departure Mitigation (RDM) control.

The storage unit 54 includes a non-illustrated random access memory (RAM) and a non-illustrated read only memory (ROM). The camera information Sc, the radar information Sr, and data to be provided to the various computation processes, etc., are stored, for example, in the RAM. Programs, tables, maps, and the like are stored, for example, in the ROM.

Figure 2:
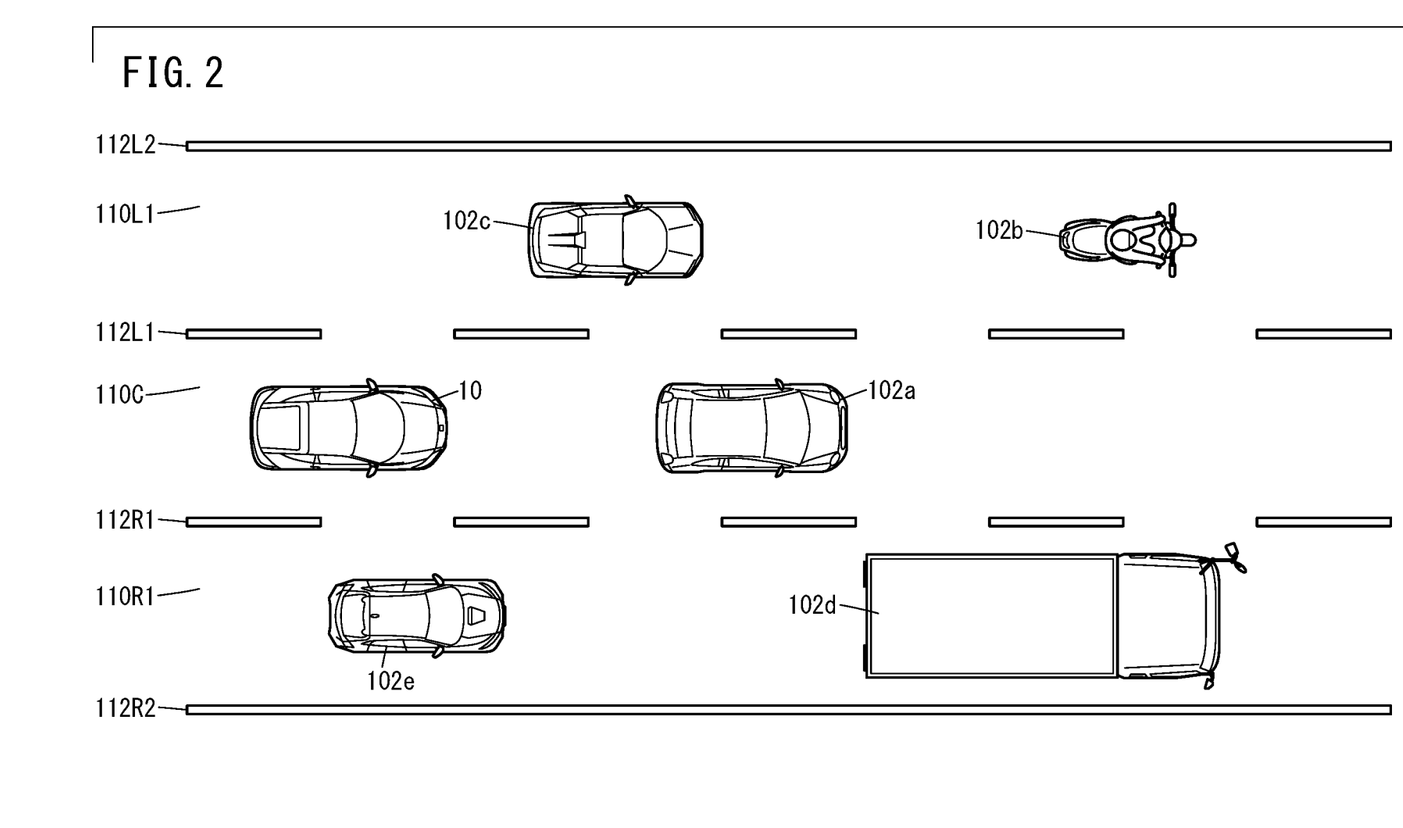
FIG. 2 is a view showing an example of a travel state.
Figure 3:
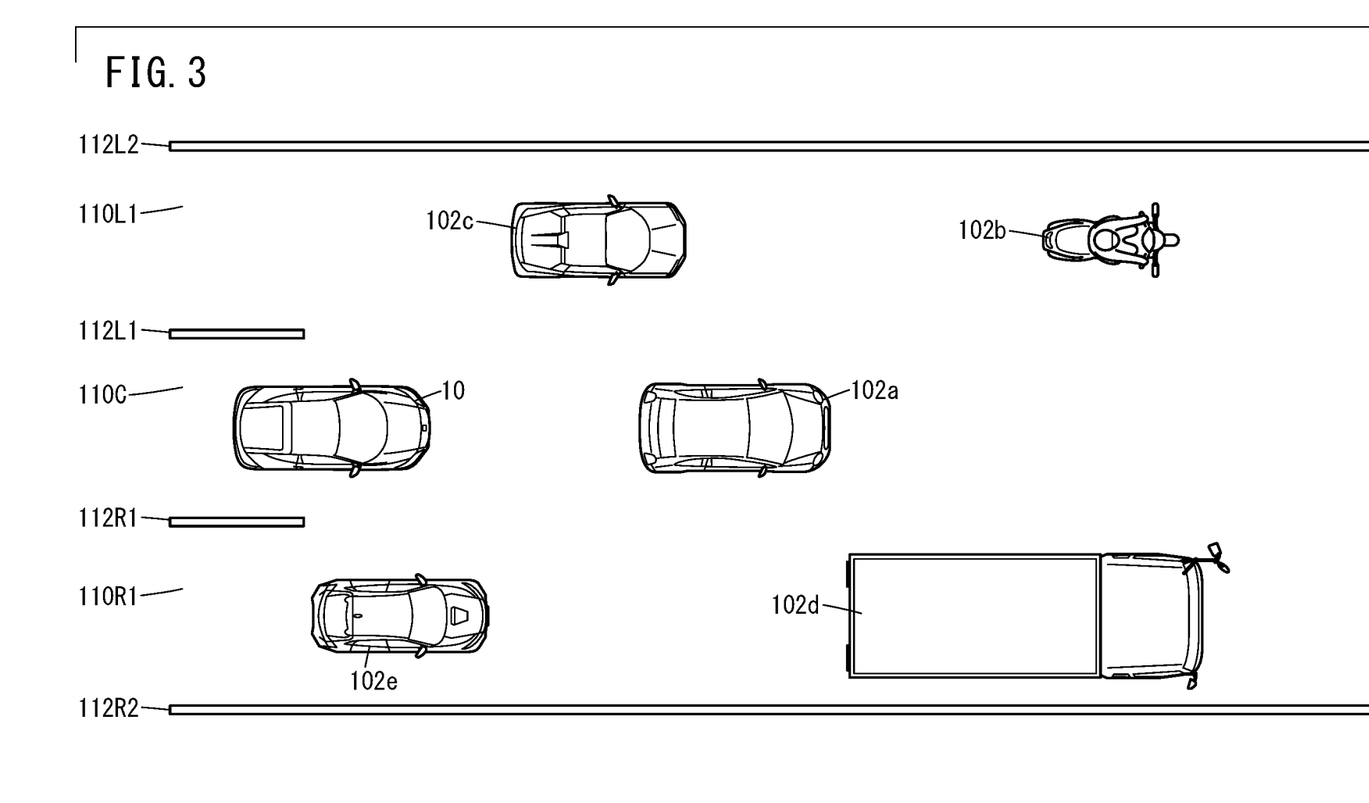
FIG. 3 is a view showing an example of a travel state.
Figure 4:
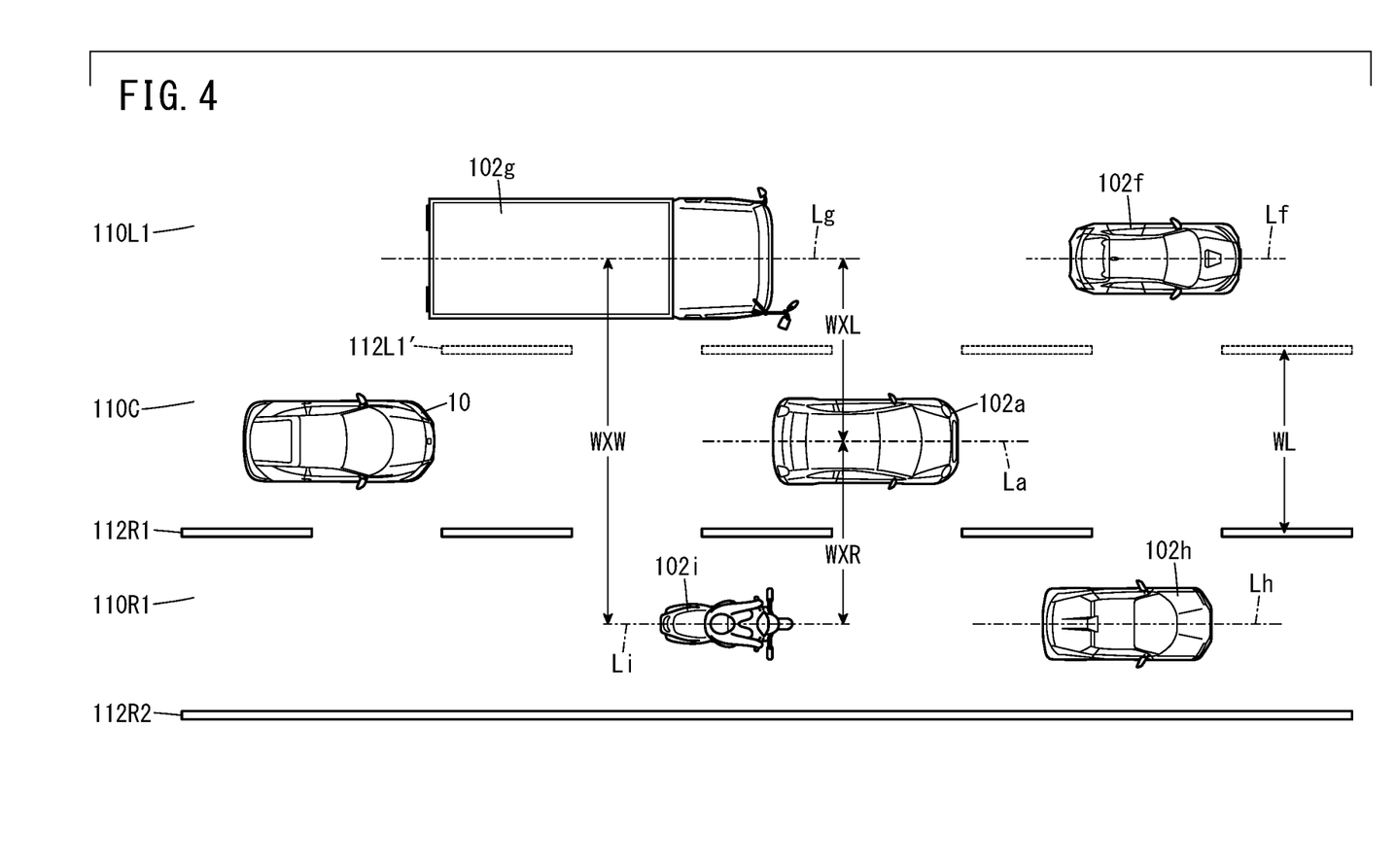
FIG. 4 is a view showing an example of a travel state.

FIGS. 2 to 4 are views showing examples of a travel state. FIG. 2 illustrates an example of a case in which the lane markings 112L1 and 112R1 are detected on the left and right sides of the host vehicle 10. In the example shown in FIG. 2, the host vehicle lane 110C, a lane (adjacent lane) 110R1 adjacent to the right side of the host vehicle lane 110C, and a lane (adjacent lane) 110L1 adjacent to the left side of the host vehicle lane 110C are shown. The host vehicle lane 110C is partitioned by the lane markings 112L1 and the lane markings 112R1. The adjacent lane 110L1 is partitioned by the lane markings 112L2 and the lane markings 112L1. The adjacent lane 110R1 is partitioned by the lane markings 112R1 and the lane markings 112R2. In the example shown in FIG. 2, the width of the lanes 110, i.e., the lane width, is comparatively wide.

In the example shown in FIG. 2, the host vehicle 10 and the preceding vehicle 102a are traveling in the host vehicle lane 110C. The preceding vehicle is another vehicle 102 that is traveling immediately in front of the host vehicle 10. Further, in the example shown in FIG. 2, the other vehicles 102b and 102c are traveling in the adjacent lane 110L1. Further, in the example shown in FIG. 2, the other vehicles 102d and 102e are traveling in the adjacent lane 110R1. In the case that the lane markings 112 are located within a predetermined distance from the position of the host vehicle 10, the determination unit 76 determines that the lane markings 112 are the lane markings of the host vehicle lane 110C. Although the position of the host vehicle 10 can be any arbitrary position on the longitudinal center line of the host vehicle 10, the present embodiment is not limited to this feature. In the case that the lane markings 112L1 and 112R1 are detected on both sides of the host vehicle 10, the determination unit 76 determines the position of the host vehicle lane 110C on the basis of the lane markings 112L1 and 112R1 located on the left and right sides of the host vehicle 10.

When the host vehicle 10 continues traveling after having passed through the state shown in FIG. 2, it is possible that the host vehicle 10 may approach a location where the lane markings 112L1 and 112R1 cannot be detected on the left and right sides of the host vehicle 10 (see FIG. 3). For example, in the case that the host vehicle 10 has approached a location where the lane markings 112L1 and 112R1 are worn away, it is possible that the lane markings 112L1 and 112R1 cannot be detected on the left and right sides of the host vehicle 10. Further, also in the case that the host vehicle 10 has come into proximity near to an intersection, it is possible that the lane markings 112L1 and 112R1 cannot be detected on the left and right sides of the host vehicle 10.

When traveling of the host vehicle 10 is further continued, the host vehicle 10 may approach a location at which the lane markings 112 are detected on one side of the host vehicle 10, but the lane markings 112 are not detected on the other side of the host vehicle 10 (see FIG. 4). For example, in the case that the lane markings 112 on one side of the host vehicle 10 are relatively new, whereas the lane markings 112 on the other side of the host vehicle 10 are worn away, there is a possibility that the lane markings 112 on the other side of the host vehicle 10 may not be detected. Moreover, a transition may be made from the state shown in FIG. 2 to the state shown in FIG. 4 without passing through the state shown in FIG. 3. In the example shown in FIG. 4, the lane markings 112R1 are detected on the right side of the host vehicle 10, whereas on the other hand, the lane markings 112L1' are not detected on the left side of the host vehicle 10. In the example shown in FIG. 4, the host vehicle 10 and the preceding vehicle 102a are traveling in the host vehicle lane 110C. Further, in the example shown in FIG. 4, the other vehicles 102f and 102g are traveling in the adjacent lane 110L1 on the left side of the host vehicle lane 110C. Further, in the example shown in FIG. 4, the other vehicles 102h and 102i are traveling in the adjacent lane 110R1 on the right side of the host vehicle lane 110C. In the example shown in FIG. 4, no lane markings 112 are present that partition the host vehicle lane 110C from the adjacent lane 110L1, and the lane markings 112L1', which are estimated as described later, are illustrated using dotted lines.

In the case that the lane markings 112 are detected on one side of the host vehicle 10, but the lane markings 112 are not detected on the other side of the host vehicle 10, the determination unit 76 performs the following process. More specifically, in such a case, the determination unit 76 estimates the lane width WL of the host vehicle lane 110C on the basis of the distance in the lane widthwise direction of the other vehicles 102 that are traveling in the mutually different lanes 110. The reason for estimating the lane width WL of the host vehicle lane 110C on the basis of the distance in the lane widthwise direction of the other vehicles 102 that are traveling in the mutually different lanes 110 is as follows. More specifically, generally, the vehicles frequently travel in the center of the lanes 110 in which the vehicles travel. Therefore, it is frequently the case that the positions of the longitudinal center lines of the other vehicles 102 coincide with the longitudinal center lines of the lanes 110 in which the other vehicles 102 travel. Further, the lane widths of the mutually adjacent lanes 110 are often substantially equivalent. Therefore, the distance in the lane widthwise direction of the other vehicles 102 that are traveling respectively in the mutually adjacent lanes 110 is frequently equivalent to the lane width WL of the host vehicle lane 110C. Due to such reasoning, according to the present embodiment, the lane width WL of the host vehicle lane 110C is estimated on the basis of the distance in the lane widthwise direction of the other vehicles 102 that are traveling in the mutually different lanes 110.

The determination unit 76, for example, estimates the lane width WL on the basis of the distance in the lane widthwise direction between the position La of the preceding vehicle 102a and the position L of the other vehicles 102 that are traveling in the lanes 110 that differ from the host vehicle lane 110C. When describing the positions L of the other vehicles 102 in general, the reference character L is used, and when describing respective individual positions of the other vehicles 102a and 102f to 102i, the reference characters La and Lf to Li are used. The determination unit 76, for example, is capable of estimating the lane width WL of the host vehicle lane 110C on the basis of the distance WXL in the lane widthwise direction between the position La of the preceding vehicle 102a, and the position Lg of the other vehicle 102g traveling in the adjacent lane 110L1 on the left side. Further, the determination unit 76 is capable of estimating the lane width WL of the host vehicle lane 110C on the basis of the distance WXR in the lane widthwise direction between the position La of the preceding vehicle 102a, and the position Li of the other vehicle 102i traveling in the adjacent lane 110R1 on the right side.

The determination unit 76 can also estimate the lane width WL of the host vehicle lane 110C in the following manner. The determination unit 76 is capable of estimating the lane width WL on the basis of the position L of a first other vehicle 102 traveling in a first lane 110 that differs from the host vehicle lane 110C, and the position L of a second other vehicle 102 traveling in a second lane 110 that differs from the host vehicle lane 110C. In the example shown in FIG. 4, the first lane 110, for example, is the adjacent lane 110L1 on the left side of the host vehicle lane 110C, and the second lane 110, for example, is the adjacent lane 110R1 on the right side of the host vehicle lane 110C. The determination unit 76 can estimate one half of the distance WXW in the lane widthwise direction between the position Lg of the other vehicle 102g traveling in the adjacent lane 110L1 and the position Li of the other vehicle 102i traveling in the adjacent lane 110R1 as being the lane width WL of the host vehicle lane 110C.

The travel assist unit 64 can control traveling of the host vehicle 10 on the basis of the estimated lane width WL, and the lane markings 112 located on one side of the host vehicle 10. In the example shown in FIG. 4, traveling of the host vehicle 10 is controlled, for example, based on the estimated lane width WL, and the lane markings 112R1 located on the right side of the host vehicle 10.

Figure 7:
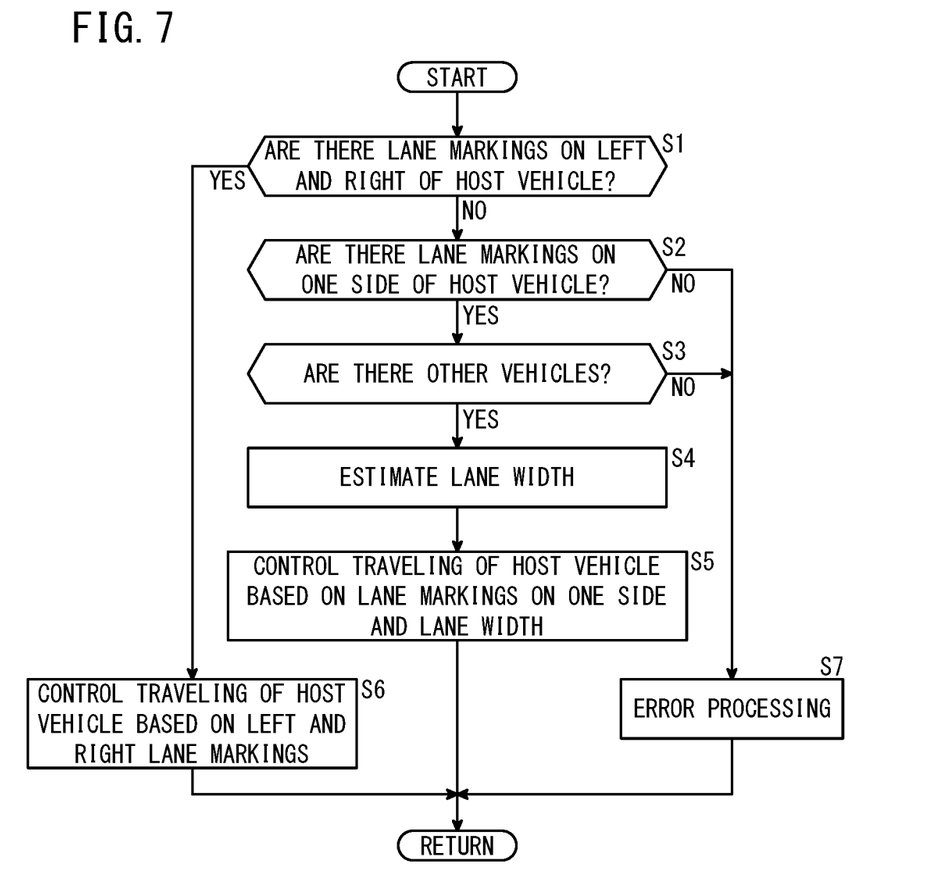
FIG. 7 is a flowchart illustrating an example of operations of the vehicle control device according to an embodiment.

FIG. 7 is a flowchart illustrating an example of operations of the vehicle control device according to the present embodiment.

In step S1, the determination unit 76 makes a determination as to whether or not the lane markings 112 are present on the left and right sides of the host vehicle 10. In the case that the lane markings 112L1 and 112R1 exist on the left and right sides of the host vehicle 10 (YES in step S1), the process proceeds to step S6. In the case that the lane markings 112 exist on only one side of the host vehicle 10 (NO in step S1), the process proceeds to step S2. In the case that the lane markings 112 do not exist on either the left side or the right side of the host vehicle 10 (NO in step S1), the process proceeds to step S2.

In step S2, the determination unit 76 makes a determination as to whether or not the lane markings 112 are present on one side of the host vehicle 10. In the case that the lane markings 112 exist on one side of the host vehicle 10 (YES in step S2), the process proceeds to step S3. In the case that the lane markings 112 do not exist on the left side as well as on the right side of the host vehicle 10 (NO in step S2), the process proceeds to step S7.

In step S3, the other vehicle recognition unit 60 determines whether or not a plurality of other vehicles 102 exist that are traveling respectively in the mutually different lanes 110. Based on the camera information Sc and the radar information Sr, it is determined whether or not there are a plurality of other vehicles 102 that are traveling respectively in the mutually different lanes 110. Moreover, the presence or absence of the other vehicles 102 may be determined on the basis of either one of the camera information Sc and the radar information Sr. In the case that a plurality of the other vehicles 102 that are traveling respectively in the mutually different lanes 110 exist (YES in step S3), the process proceeds to step S4. In the case that a plurality of the other vehicles 102 that are traveling respectively in the mutually different lanes 110 do not exist (NO in step S3), the process proceeds to step S7.

In step S4, the determination unit 76 estimates the lane width WL of the host vehicle lane 110C, on the basis of the positions L of the plurality of other vehicles 102 that are traveling respectively in the mutually different lanes 110. For example, the lane width WL of the host vehicle lane 110C can be estimated based on the distance WXL in the lane widthwise direction between the position La of the preceding vehicle 102a, and the position Lg of the other vehicle 102g traveling in the adjacent lane 110L1 on the left side. In this case, for example, the distance WXL is estimated to be the lane width WL of the host vehicle lane 110C. Further, for example, the lane width WL of the host vehicle lane 110C can be estimated on the basis of the distance WXR in the lane widthwise direction between the position La of the preceding vehicle 102a, and the position Li of the other vehicle 102i traveling in the adjacent lane 110R1 on the right side. In this case, for example, the distance WXR is estimated to be the lane width WL of the host vehicle lane 110C. Further, for example, the lane width WL of the host vehicle lane 110C can be estimated on the basis of the distance WXW in the lane widthwise direction between the position Lg of the other vehicle 102g traveling in the adjacent lane 110L1, and the position Li of the other vehicle 102i traveling in the adjacent lane 110R1. In this case, for example, one half of the distance WXW is estimated to be the lane width WL of the host vehicle lane 110C. Thereafter, the process proceeds to step S5.

In step S5, the travel assist unit 64 controls traveling of the host vehicle 10 on the basis of the lane markings 112 on one side of the host vehicle 10 and the estimated lane width WL. For example, traveling of the host vehicle 10 is controlled in a manner so that a position separated from the lane markings 112 by a distance corresponding to one half of the estimated lane width WL coincides with a position on the center line in the longitudinal direction of the host vehicle lane 110C. More specifically, the travel assist unit 64 executes the LKAS control and the RDM control. In the LKAS control, for example, steering operations are assisted in a manner so that the host vehicle 10 travels in the center of the host vehicle lane 110C and the driving load is reduced. In the LKAS control, the travel assist unit 64 outputs steering angle commands with respect to the EPS ECU 34 in a manner so that, for example, the host vehicle 10 travels in the center of the host vehicle lane 110C. The LKAS control may be used in combination with the aforementioned automatic cruise control. In the RDM control, when the host vehicle 10 is about to depart from or has deviated from the lane 110C, the host vehicle 10 is prevented from departing from the lane 110C by controlling braking and steering. During the RDM control, the travel assist unit 64 outputs braking instructions with respect to the braking ECU 32 together with outputting steering angle instructions with respect to the EPS ECU 34, in order to prevent the host vehicle 10 from departing from the lane 110C.

In step S6, the travel assist unit 64 controls traveling of the host vehicle 10 on the basis of the lane markings 112 on the left and right sides of the host vehicle 10.

In step S7, the computation unit 52 executes an error process. In this case, by the travel assist ECU 44, a travel assist is carried out on the premise that the position of the host vehicle lane 110C in which the host vehicle 10 is traveling is not being correctly detected. Upon completion of the above steps, the process shown in FIG. 7 is brought to an end.

In the foregoing manner, according to the present embodiment, when the lane markings 112 located on one side of the host vehicle 10 are detected, whereas the lane markings 112 located on the other side of the host vehicle 10 are not detected, the following process is performed. More specifically, the lane width WL of the host vehicle lane 110C is estimated on the basis of the distances WXL, WXR, and WXW in the lane widthwise direction of the other vehicles 102 that are traveling in the mutually different lanes 110. Then, traveling of the host vehicle 10 is controlled on the basis of the lane markings 112 on the one side of the host vehicle 10 and the estimated lane width WL. Therefore, in accordance with the present embodiment, even in the case that the lane markings 112 located on one side of the host vehicle 10 are not detected, traveling of the host vehicle 10 can be accurately controlled.

Modification 1

A vehicle control device, a vehicle control method, and a non-transitory computer-readable medium storing a program according to a first modification of the present embodiment will be described with reference to the drawings.

The vehicle control device according to the present modification operates to estimate the lane markings 112 on the other side of the host vehicle 10 on the basis of the estimated lane width WL and the lane markings 112 located on the one side of the host vehicle 10.

According to the present modification, the determination unit 76 estimates the lane markings 112 on the other side of the host vehicle 10 on the basis of the estimated lane width WL of the host vehicle lane 110C, and the lane markings 112 located on the one side of the host vehicle 10. In the example shown in FIG. 4, the other lane markings 112L1' are estimated based on the estimated lane width WL, and the lane markings 112R1 located on the right side of the host vehicle 10. The determination unit 76 is capable of determining the position of the host vehicle lane 110C on the basis of one of the lane markings 112R1, which are the detected lane markings, and the other lane markings 112L1', which are the estimated lane markings. The travel assist unit 64 is capable of controlling traveling of the host vehicle 10 on the basis of the position of the host vehicle lane 110C as determined by the determination unit 76. The travel assist unit 64 performs a control in a manner so that the host vehicle 10 travels in the host vehicle lane 110C that was determined by the determination unit 76.

Figure 8:
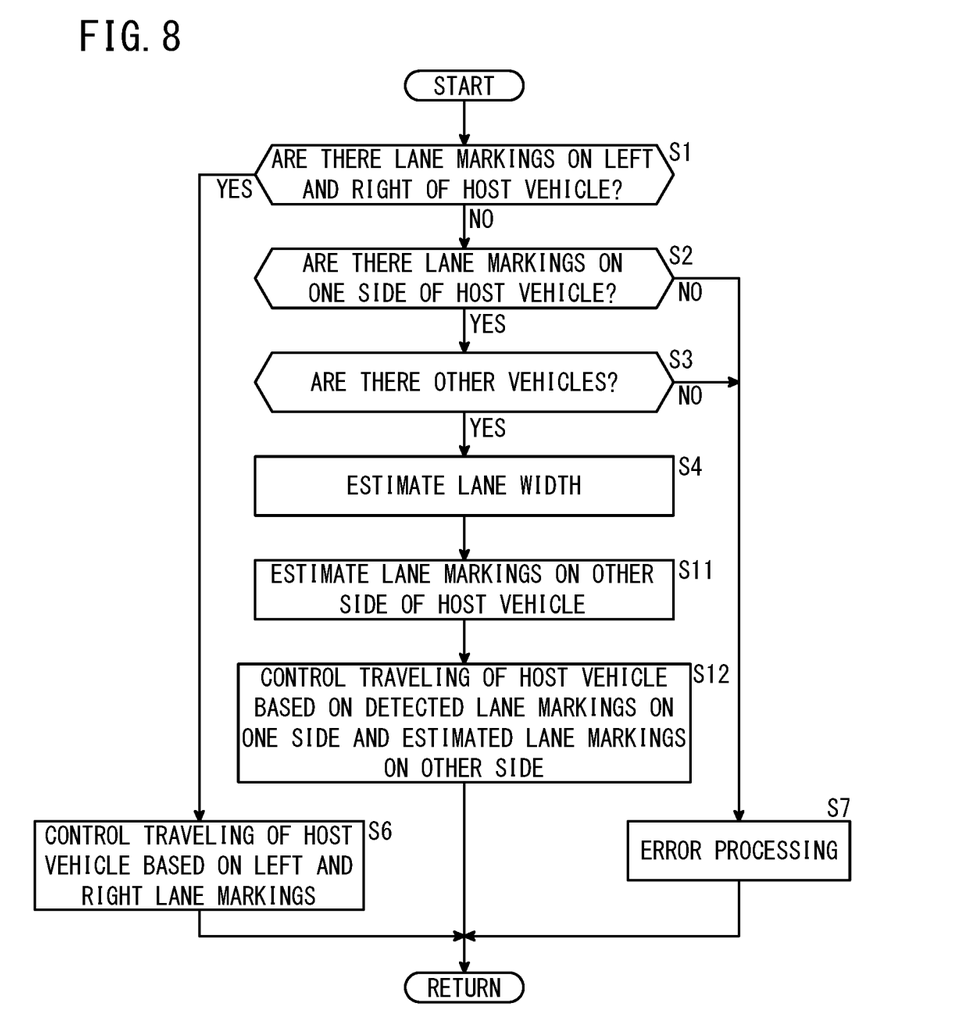
FIG. 8 is a flowchart illustrating an example of operations of the vehicle control device according to a first modification of the embodiment.

FIG. 8 is a flowchart illustrating an example of operations of the vehicle control device according to the present modification. Steps S1 to S4 are the same as steps S1 to S4 described above with reference to FIG. 7, and therefore description of these steps is omitted. After step S4 is executed, the process proceeds to step S11.

In step S11, the determination unit 76 estimates the lane markings 112 on the other side of the host vehicle 10 on the basis of the lane markings 112 on the one side of the host vehicle 10, and the estimated lane width WL of the host vehicle lane 110C. Thereafter, the process proceeds to step S12.

In step S12, the travel assist unit 64 controls traveling of the host vehicle 10 on the basis of the lane markings 112 on the one side, which are the detected lane markings, and the lane markings 112 on the other side, which are the estimated lane markings.

Steps S6 and S7 are the same as steps S6 and S7 described above with reference to FIG. 7, and therefore description of these steps is omitted. Upon completion of the above steps, the process shown in FIG. 8 is brought to an end.

In the foregoing manner, according to the present modification, the lane markings 112 on the other side of the host vehicle 10 are estimated on the basis of the lane markings 112 on the one side of the host vehicle 10 and the estimated lane width WL. Then, traveling of the host vehicle 10 is controlled on the basis of the lane markings 112 on the one side, which are the detected lane markings, and the lane markings 112 on the other side, which are the estimated lane markings. According to the present modification as well, traveling of the host vehicle 10 can be accurately controlled.

Modification 2

A vehicle control device, a vehicle control method, and a non-transitory computer-readable medium storing a program according to a second modification of the present embodiment will be described with reference to the drawings.

The vehicle control device according to the present modification operates to determine whether or not the estimated lane width WL is correct, based on whether or not roadside objects 120 are located within the adjacent lane 110 that is estimated on the basis of the estimated lane width WL.

According to the present modification, the determination unit 76 estimates the adjacent lane 110 on the basis of the estimated position of the lane markings 112 and the estimated lane width WL. In the example shown in FIG. 4, the adjacent lane 110L1 located on the left side of the host vehicle lane 110C is estimated on the basis of the estimated position of the lane markings 112L1' and the estimated lane width WL.

Figure 5:
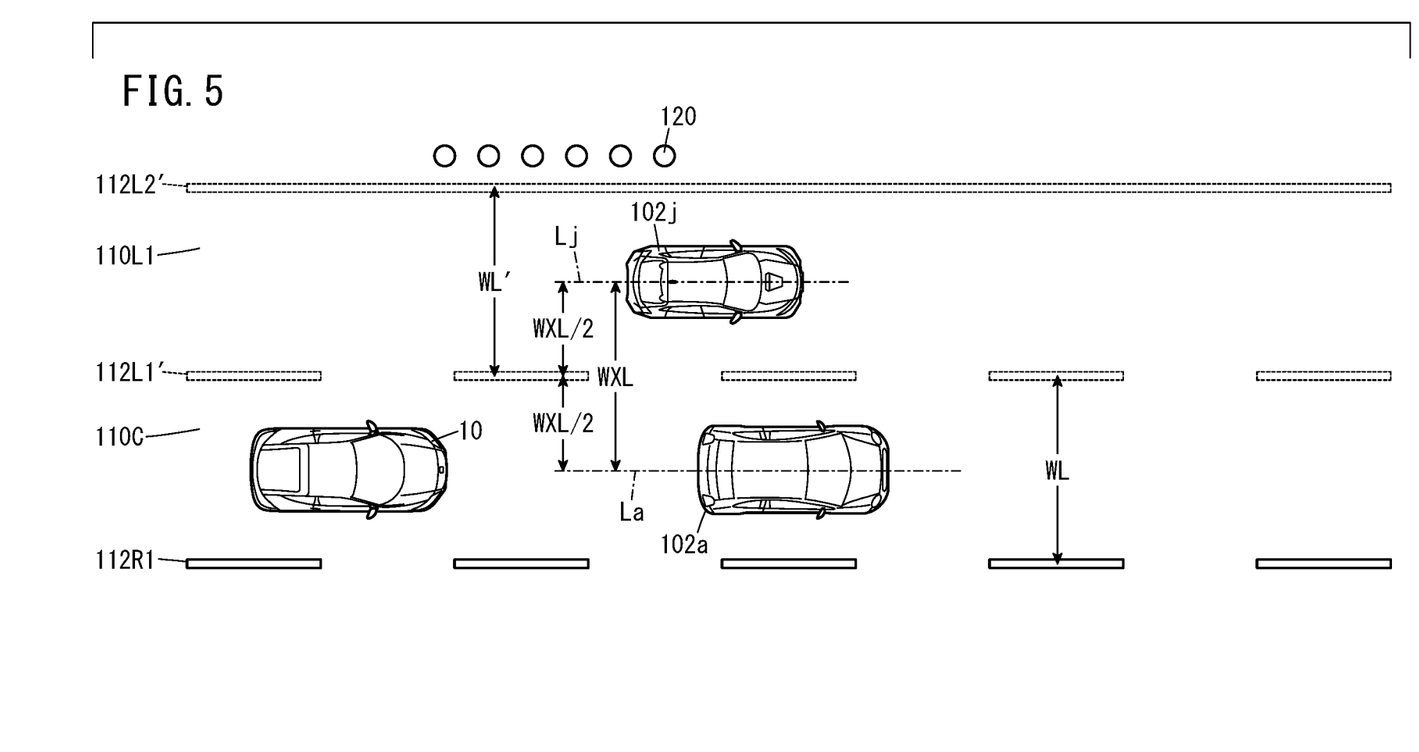
FIG. 5 is a diagram showing an example of a situation in which roadside objects are not located within an estimated adjacent lane.

FIG. 5 is a diagram showing an example of a situation in which the roadside objects 120 are not located within the estimated adjacent lane 110L1. In the example shown in FIG. 5, the position on the center line in the longitudinal direction of the preceding vehicle 102a is detected as being the position La of the preceding vehicle 102a. Further, in the example shown in FIG. 5, the position on the center line in the longitudinal direction of another vehicle 102j that is traveling in the adjacent lane 110L1 is detected as being the position Lj of the other vehicle 102j. Based on the position La of the preceding vehicle 102a and the position Lj of the other vehicle 102j, the determination unit 76 calculates the distance WXL in the lane widthwise direction between the position La of the preceding vehicle 102a and the position Lj of the other vehicle 102j. In addition, based on the calculated distance WXL, the determination unit 76 determines the lane width WL of the host vehicle lane 110C. The determination unit 76 estimates the position of the lane markings 112L1' on the left side of the host vehicle lane 110C, on the basis of the position of the lane markings 112R1 on the right side of the host vehicle lane 110C, and the estimated lane width WL. The lane markings 112L1' on the left side of the host vehicle lane 110C are located midway between the position La of the preceding vehicle 102a and the position Lj of the other vehicle 102j. In general, the lane width WL of the host vehicle lane 110C and the lane width WL' of the adjacent lane 110L1 are mutually equivalent. Therefore, the determination unit 76 estimates the lane width WL' of the adjacent lane 110L1 based on the estimated lane width WL. In addition, the determination unit 76 estimates a position which is separated by the distance WL' from the estimated position of the lane markings 112L1' in the lane widthwise direction (in a direction away from the host vehicle lane 110C) as being the position of the lane markings 112L2' on the left side of the adjacent lane 110L1. In the example shown in FIG. 5, the roadside objects 120 are not located in the adjacent lane 110L1. In such a case, the determination unit 76 determines that the estimated position of the adjacent lane 110L1 is correct.

Figure 6:
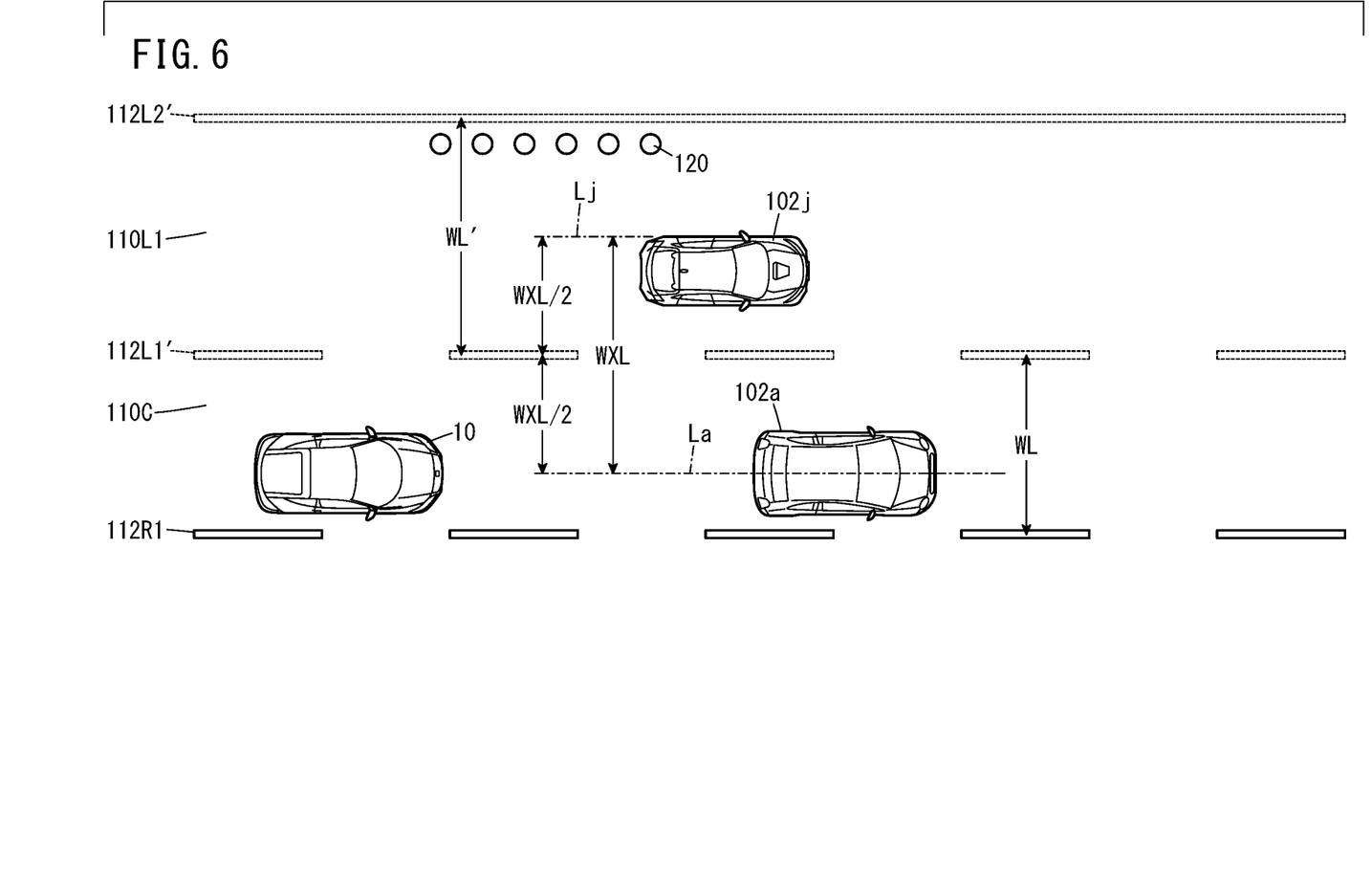
FIG. 6 is a diagram showing an example of a situation in which roadside objects are located within an estimated adjacent lane.

FIG. 6 is a diagram showing an example of a situation in which the roadside objects 120 are located within the estimated adjacent lane 110L1. In the example shown in FIG. 6, the position of the preceding vehicle 102a is detected in the same manner as in the example shown in FIG. 5. More specifically, in the example shown in FIG. 6, the position on the center line in the longitudinal direction of the preceding vehicle 102a is detected as being the position La of the preceding vehicle 102a. However, the position Lj of the other vehicle 102j as detected in the example shown in FIG. 6 differs from the position Lj of the other vehicle 102j as detected in the example shown in FIG. 5. More specifically, in the example shown in FIG. 6, the position of a left end of the other vehicle 102j is detected as being the position Lj of the other vehicle 102j. Therefore, in the example shown in FIG. 6, in comparison with the example shown in FIG. 5, the distance WXL in the lane widthwise direction between the position La of the preceding vehicle 102a and the position Lj of the other vehicle 102j is estimated to be greater. In the example shown in FIG. 6, the roadside objects 120 are located within the estimated adjacent lane 110L1. In such a case, the determination unit 76 determines that the estimated position of the adjacent lane 110L1 is not correct.

In the case that the determination unit 76 determines that the estimated position of the adjacent lane 110 is not correct, the travel assist unit 64 does not control the host vehicle 10 on the basis of the positions of the plurality of other vehicles 102. If it is determined that the estimated position of the adjacent lane 110 is not correct, the determination unit 76 does not carry out estimation of the lane width WL and estimation of the lane markings 112. Moreover, in the event it is determined that the position of the estimated adjacent lane 110 is not correct, the determination unit 76 may carry out the estimation itself of the lane width WL and the estimation itself of the lane markings 112. In this case, control of the host vehicle 10 on the basis of the estimated lane width WL or the estimated lane markings 112 is not performed by the travel assist unit 64.

Figure 9:
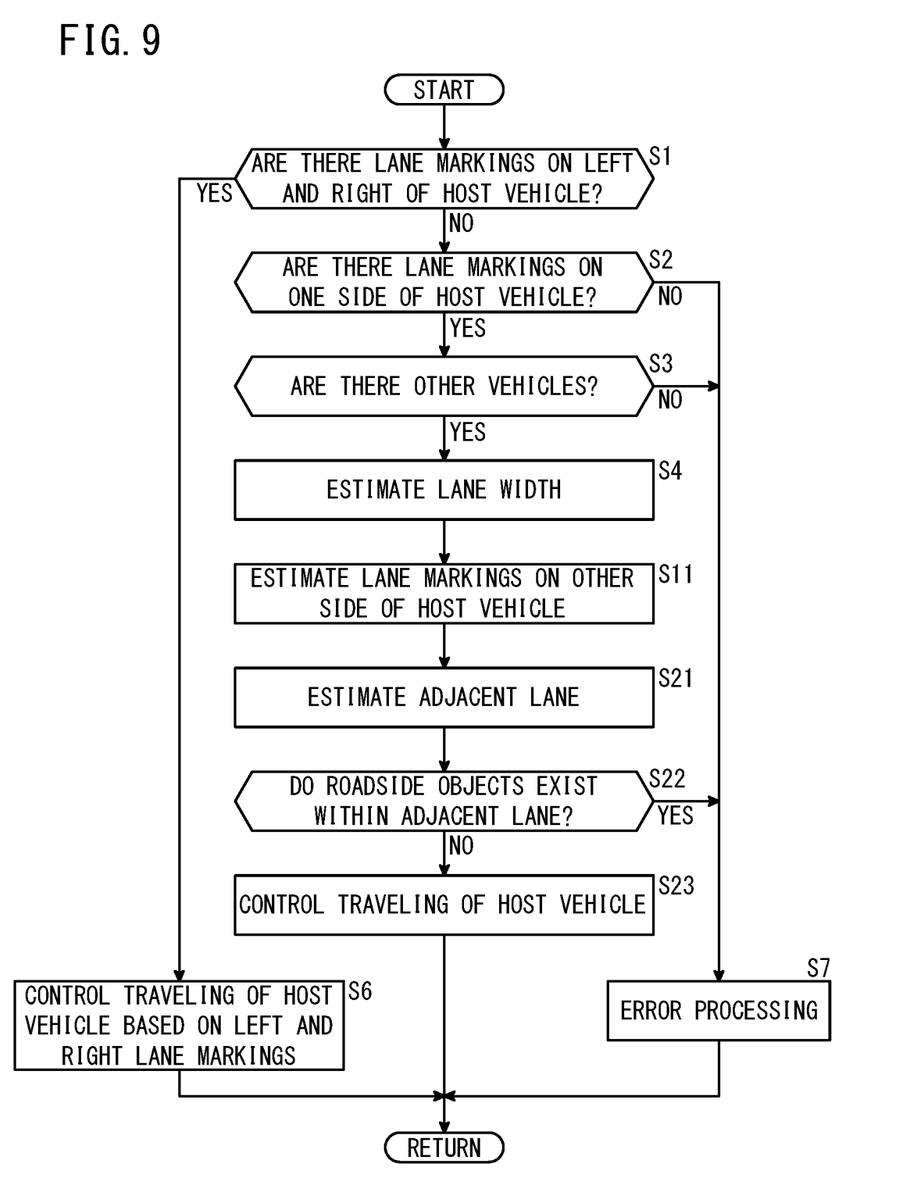
FIG. 9 is a flowchart illustrating an example of operations of the vehicle control device according to a second modification of the embodiment.

FIG. 9 is a flowchart illustrating an example of operations of the vehicle control device according to the present modification. Steps S1 to S4 are the same as steps S1 to S4 described above with reference to FIG. 7, and therefore description of these steps is omitted. After step S4 is executed, the process proceeds to step S11. Step S11 is the same as step S11 described above with reference to FIG. 8, and therefore description of this step is omitted.

In step S21, the determination unit 76 estimates the adjacent lane 110. For example, the position of the lane markings 112L1' which was estimated in step S11, that is, the position of the lane markings 112L1' on the other side of the host vehicle 10, is estimated to be the position of the lane markings 112L1' on the one side of the adjacent lane 110L1. In addition, the lane width WL' of the adjacent lane 110L1 is estimated on the basis of the estimated lane width WL of the host vehicle lane 110C. A position which is separated by the distance WL' from the estimated position of the lane markings 112L1' in the lane widthwise direction (in a direction away from the host vehicle lane 110C) is estimated as being the position of the lane markings 112L2' on the left side of the adjacent lane 110L1. Thereafter, the process proceeds to step S22.

In step S22, the determination unit 76 determines whether or not the roadside objects 120 exist within the adjacent lane 110. In the case that the roadside objects 120 exist within the adjacent lane 110 (YES in step S22), the process proceeds to step S7. In the case that the roadside objects 120 do not exist within the adjacent lane 110 (NO in step S22), the process proceeds to step S23.

In step S23, the travel assist unit 64 controls traveling of the host vehicle 10. At this time, the travel assist unit 64 may control traveling of the host vehicle 10 in the same manner as in step S5 described above with reference to FIG. 7, or may control traveling of the host vehicle 10 in the same manner as in step S12 described above with reference to FIG. 8.

Steps S6 and S7 are the same as steps S6 and S7 described above with reference to FIG. 7, and therefore description of these steps is omitted. Upon completion of the above steps, the process shown in FIG. 9 is brought to an end.

In the foregoing manner, according to the present modification, a determination is made as to whether or not the estimated lane width WL of the host vehicle lane 110C is correct on the basis of whether or not the roadside objects 120 exist within the estimated adjacent lane 110. Therefore, according to the present modification, traveling of the host vehicle 10 can be accurately controlled.

Modified Embodiments

The present invention is not limited to the embodiment described above, and various modifications are possible.

For example, in the above-described embodiment, although white lines (solid lines and broken lines) of the road were assumed as making up the lane markings 112, the present invention is not limited to this feature. For example, the lane markings 112 may comprise any of yellow lines, Botts' dots, cat's eyes, or the like. Further, the lane markings 112 may be guard rails. Further, the lane markings 112 may be virtual markings arranged at a position separated by a predetermined distance from the guard rails.

Summarizing the above-described embodiment and modifications thereof, the characteristic features described below are realized.

The vehicle control device (44) is equipped with the detection unit (60, 62) configured to detect the lane marking (112) and another vehicle (102) on the basis of peripheral information, and the control unit (64) which, in the case that the lane marking is detected on one side of a host vehicle (10), but the lane marking is not detected on the other side of the host vehicle, is configured to control the host vehicle on the basis of the positions of the plurality of other vehicles that are traveling respectively in mutually different lanes. In accordance with such a configuration, even if the lane markings on the other side of the host vehicle lane are not detected, traveling of the host vehicle can be suitably controlled on the basis of the positions of the plurality of other vehicles that are traveling respectively in the mutually different lanes.

The control unit may estimate the lane width (WL) of the host vehicle lane on the basis of the positions of the plurality of other vehicles that are traveling in the mutually different lanes, and may control the host vehicle based on the estimated lane width.

The control unit may estimate the lane width of the host vehicle lane on the basis of the positions of the plurality of other vehicles that are traveling in the mutually different lanes, and may estimate the lane marking on the other side of the host vehicle lane based on the estimated lane width.

The control unit may estimate the lane width of the host vehicle lane on the basis of the positions of the plurality of other vehicles traveling in the mutually different lanes, and estimate an adjacent lane which is a lane adjacent to the host vehicle lane on the basis of the estimated lane width, and in the case that a roadside object is located within the estimated adjacent lane, the control unit does not control the host vehicle on the basis of the positions of the other vehicles. Since it is possible to determine whether or not the estimated lane width is correct on the basis of whether or not a roadside object is located within the estimated adjacent lane, it is possible to more suitably control traveling of the host vehicle.

The control unit may estimate the lane width of the host vehicle lane on the basis of the position of the preceding vehicle, and the positions of the other vehicles that are traveling in the lanes differing mutually from the host vehicle lane.

The control unit may estimate the lane width of the host vehicle lane on the basis of the position of the first other vehicle traveling in the first lane from among the plurality of lanes that differ from the host vehicle lane, and the position of the second other vehicle traveling in the second lane that differs from the first lane from among the plurality of lanes that differ from the host vehicle lane.

The vehicle control method comprises the step (S1 to S3) of detecting the lane markings and another vehicle on the basis of peripheral information, and the step (S5) of controlling a host vehicle on the basis of the positions of the plurality of other vehicles that are traveling respectively in the mutually different lanes, in the case that the lane marking is detected on one side of the host vehicle, but the lane marking is not detected on the other side of the host vehicle.

The non-transitory computer-readable storage medium stores a program, wherein the program serves to execute in a computer the step (S1 to S3) of detecting the lane marking and another vehicle on the basis of peripheral information, and the step (S5) of controlling a host vehicle on the basis of the positions of the plurality of other vehicles that are traveling respectively in the mutually different lanes, in the case that the lane marking is detected on one side of the host vehicle, but the lane marking is not detected on the other side of the host vehicle.

What is claimed is:

1. A vehicle control device, comprising:
   one or more processors that execute computer-executable instructions stored in a memory, wherein the one or more processors execute the computer-executable instructions to cause the vehicle control device to:
   detect a lane marking and another vehicle on a basis of peripheral information;
   control the host vehicle on a basis of positions of a plurality of other vehicles that are traveling respectively in mutually different lanes, in a case that the lane marking is detected on one side of a host vehicle, but the lane marking is not detected on another side of the host vehicle;
   estimate a lane width of a host vehicle lane on the basis of the positions of the plurality of other vehicles that are traveling in the mutually different lanes, and control the host vehicle based on the estimated lane width;
   estimate an adjacent lane which is a lane adjacent to the host vehicle lane on a basis of the estimated lane width; and
   disable control of the host vehicle on a basis of the positions of the plurality of other vehicles, in a case that a roadside object is located within the estimated adjacent lane.

2. The vehicle control device according to claim 1, wherein the one or more processors cause the vehicle control device to estimate the lane width of the host vehicle lane on a basis of a position of a preceding vehicle, and the positions of the other vehicles that are traveling in the lanes differing mutually from the host vehicle lane.

3. The vehicle control device according to claim 1, wherein the one or more processors cause the vehicle control device to estimate the lane width of the host vehicle lane on a basis of a position of a first other vehicle traveling in a first lane from among the plurality of lanes that differ from the host vehicle lane, and a position of a second other vehicle traveling in a second lane that differs from the first lane from among the plurality of lanes that differ from the host vehicle lane.

4. A vehicle control device, comprising:
one or more processors that execute computer-executable instructions stored in a memory, wherein the one or more processors execute the computer-executable instructions to cause the vehicle control device to:
detect a lane marking and another vehicle on a basis of peripheral information;
control the host vehicle on a basis of positions of a plurality of other vehicles that are traveling respectively in mutually different lanes, in a case that the lane marking is detected on one side of a host vehicle, but the lane marking is not detected on another side of the host vehicle;
estimate a lane width of a host vehicle lane on the basis of the positions of the plurality of other vehicles that are traveling in the mutually different lanes, and estimate the lane marking on the other side of the host vehicle lane based on the estimated lane width;
estimate an adjacent lane which is a lane adjacent to the host vehicle lane on a basis of the estimated lane width; and
disable control of the host vehicle on a basis of the positions of the plurality of other vehicles, in a case that a roadside object is located within the estimated adjacent lane.

5. A vehicle control method, comprising:
a step of detecting a lane marking and another vehicle on a basis of peripheral information; and
a step of controlling a host vehicle on a basis of positions of a plurality of the other vehicles that are traveling respectively in mutually different lanes, in a case that the lane marking is detected on one side of the host vehicle, but the lane marking is not detected on another side of the host vehicle,
wherein in the step of controlling the host vehicle,
estimating a lane width of a host vehicle lane on the basis of the positions of the plurality of other vehicles that are traveling in the mutually different lanes,
controlling the host vehicle based on the estimated lane width,
estimating an adjacent lane which is a lane adjacent to the host vehicle lane on a basis of the estimated lane width, and
disabling control of the host vehicle on a basis of the positions of the plurality of other vehicles, in a case that a roadside object is located within the estimated adjacent lane.

6. A non-transitory computer-readable storage medium storing a program, wherein the program serves to execute in a computer:
a step of detecting a lane marking and another vehicle on a basis of peripheral information; and
a step of controlling a host vehicle on a basis of positions of a plurality of the other vehicles that are traveling respectively in mutually different lanes, in a case that the lane marking is detected on one side of the host vehicle, but the lane marking is not detected on another side of the host vehicle,
wherein in the step of controlling the host vehicle,
estimating a lane width of the host vehicle lane on the basis of the positions of the plurality of other vehicles that are traveling in the mutually different lanes,
controlling the host vehicle based on the estimated lane width,
estimating an adjacent lane which is a lane adjacent to the host vehicle lane on a basis of the estimated lane width, and
disabling control of the host vehicle on a basis of the positions of the plurality of other vehicles, in a case that a roadside object is located within the estimated adjacent lane.

\* \* \* \* \*